United States Patent [19]

Knipp et al.

[11] Patent Number: 4,870,112
[45] Date of Patent: Sep. 26, 1989

[54] FOAMABLE, GELABLE AND HEAT VULCANIZABLE COMPOSITION OF MATTER FOR THE THE MANUFACTURE OF LATEX FOAM

[75] Inventors: Herbert Knipp, Haltern; Wolfgang Schulz, Marl, both of Fed. Rep. of Germany

[73] Assignee: Huels Aktiengesellschaft, Marl, Fed. Rep. of Germany

[21] Appl. No.: 50,108

[22] Filed: May 15, 1987

[30] Foreign Application Priority Data

May 17, 1986 [DE] Fed. Rep. of Germany ....... 3616793
Feb. 11, 1987 [DE] Fed. Rep. of Germany ....... 3704118

[51] Int. Cl.$^4$ .............................. C08J 9/28; C08J 9/30
[52] U.S. Cl. ......................................... 521/70; 521/71; 521/84.1; 521/92; 521/907; 524/426; 524/444; 524/447; 524/519; 524/526; 525/215; 525/233; 525/236
[58] Field of Search .................... 521/70, 71; 524/426, 524/444, 447, 519, 526

[56] References Cited

U.S. PATENT DOCUMENTS

| 2,882,327 | 4/1959 | Roberts | 521/70 |
| 3,238,172 | 3/1966 | Talalay et al. | 521/70 |
| 3,457,201 | 7/1969 | Smith et al. | 521/70 |
| 3,493,523 | 2/1970 | Fox et al. | 521/70 |
| 3,542,700 | 11/1970 | Hilditch et al. | 521/70 |
| 3,719,614 | 3/1973 | Wright | 521/70 |
| 3,904,558 | 9/1975 | Graham et al. | 521/70 |
| 3,968,285 | 7/1976 | Coffin et al. | 521/70 |
| 3,969,289 | 7/1976 | Coffin et al. | 521/70 |
| 4,214,053 | 7/1980 | Porter | 521/70 |

Primary Examiner—Morton Foelak
Attorney, Agent, or Firm—Millen & White

[57] ABSTRACT

A foamable, gelable and heat-vulcanizable composition for the manufacture of latex foam having, e.g., the following properties:

(a) the indentation hardness must be sufficiently high;
(b) the pore structure is to be uniformly fine for an adequate layer thickness, comprises a mixture of a rubber latex and a filler/rubber powder, a vulcanizing agent and conventional additives.

The latex foams according to the invention are excellently suited as vibration damping materials, the mass to volume ratio and correspondingly the hardness being adjustable depending on the intended use to a high or low value.

15 Claims, No Drawings

FOAMABLE, GELABLE AND HEAT VULCANIZABLE COMPOSITION OF MATTER FOR THE THE MANUFACTURE OF LATEX FOAM

BACKGROUND OF THE INVENTION

According to the state of the art, latex foam is manufactured by a procedure in which a composition which is foamable, gelable and heat-vulcanizable and comprises an aqueous rubber dispersion, a sulfur vulcanizing agent and conventional additives, is foamed with air or another gas and is mixed and gelled with a gelling agent such as for example sodium silicofluoride ($Na_2SiF_6$), and is then vulcanized under hot conditions. Gelling takes place at room temperature, in an infrared zone or during the heating-up phase preceding vulcanization. The latex foam so manufactured comprises a cellular structure (E. W. Madge, Latex Foam Rubber, Mclaren & Sons, London, 1962).

Latex foam is desired to have a pattern of properties which may be defined by the following combination:

(a) the hardness, i.e., the indentation hardness C (DIN 53 576) must be sufficiently high;

(b) the pore structure is to be uniformly fine for an adequate layer thickness.

A further requirement is reliability, more particularly the assurance that in the manufacture of the latex foam from a wet foam no processing problems, i.e., in particular no gelling problems are to occur.

Further properties of the latex foam which may optionally be desired depending on the intended use are:

(c) high elasticity (flexibility), i.e, in the desired temperature range, any residual compressive deformation after prolonged compression (permanent deformation, compression set) is to be as low as possible (DIN 53 572);

(d) high damping in the desired temperature range; or (e) a good compromise of adequately high elasticity and adequately high damping in the desired temperature range; in this context long-term compression fatigue should be sufficiently low (prolonged vibration test, DIN 53 574).

The hardness is controlled essentially by the mass to volume ratio of the latex foam (the lower the degree of foaming and the higher the corresponding mass to volume ratio, the higher will be the indentation hardness C) and by the selection of the rubber component. The latter is either a non-reinforced or a reinforced rubber component. In the latter case, the lowest possible mass to volume ratio for a given indentation hardness C is aimed at, and high cost effectiveness is attained, a reduction of elasticity due to the reinforcement being tolerated (DE-PS 10 56 364; DE-OSS 14 70 810 and 34 47 585).

The above described combination of properties (a and b) is, generally speaking, attained adequately in forms of applications which require an indentation hardness C (at 40% deformation) of less than 400N (typical mass to volume ratio 0.1 g/cm$^3$, light foam) or which, at only 6% deformation, similarly require a value C of less than 400N (typical mass to volume ratio of 0.3 g/cm$^3$, bordering on heavy foams).

However, this is not attained if latex foams with indentation hardnesses C at 6% deformation of more than 500N, in particular more than 1000N, are required, especially for foams of a layer thickness of more than 10 mm. Such latex foams cannot be produced from wet foams comprising a non-reinforced or reinforced rubber component. At mass to volume ratios of more than 0.3 g/cm$^3$, gelling problems were usually experienced, in particular, at layer thicknesses of more than 10 mm. The latex foams so attained suffered from an uneven pore structure and from surface blemishes. They were accordingly useless. A slight improvement of the pore structure was attainable by the addition of chalk as a filler (20 pphr, comparative example A; see Table). However, this expedient resulted in impaired elasticity.

SUMMARY OF THE INVENTION

It is an object of this invention to provide a foamable, gelable and heat vulcanizable composition of matter from which a latex foam (in layer thicknesses of more than 10 mm) can be attained with adequate reliability and having the described combination of properties (a and b; indentation hardness C at 6% deformation of more than 500N).

Upon further study of the specification and appended claims, further objects and advantages of this invention will become apparent to those skilled in the art.

These objects have been achieved, surprisingly, by providing a foamable, gelable and heat-vulcanizable composition comprising an aqueous rubber dispersion, a sulphur vulcanizing agent and conventional additives, wherein the rubber dispersion is a mixture of a natural rubber latex and/or a synthetic, highly unsaturated rubber latex on the one hand (A) and a powder composed of filler and a natural rubber and/or a synthetic, highly unsaturated rubber on the other hand (B).

The component A is a natural rubber latex (NR-latex), a synthetic, highly unsaturated, optionally agglomerated rubber latex produced by emulsion polymerization (free radical induced polymerization) in the presence of conventional fatty soaps and/or rosin soaps serving as emulsifiers or a mixture of the aforesaid latices, or a mixture of one or more of the aforesaid latices with a conventional reinforcing latex (latex of a reinforcing polymerization product).

An agglomerated chloroprene rubber latex (CR-latex), an optionally agglomerated styrene-butadiene rubber latex (SBR-latex) or a mixture of the aforesaid latices is suitable. Agglomerated latices are such latices which have been subjected to conventional procedures which bring about the agglomeration of the rubber particles (DE-PSS 12 13 984 and 26 45 082). The CR-latex and the SBR-latex are not carboxylated. They are obtained by emulsion polymerization (free radical induced polymerization) in the presence of a conventional fatty soap and/or a rosin soap serving as emulsifier. The SBR typically comprises 15 to 35, preferably 20 to 30% by weight of structural units derived from the polymerization of styrene. When a mixture of rubbers is utilized for A, the amounts of each are not critical.

A highly unsaturated rubber is understood to be a rubber containing at least 50% by weight of structural units obtained by polymerization of dienes.

If the ratio of the component B to the component A is small, it is necessary in the manufacture of the latter to evaporate down the rubber latex, optionally agglomerated, or the mixture thereof with a reinforcing latex (latex of a reinforcing polymerization product). This as a rule is done to such an extent that the composition of matter according to the invention is still pumpable and foamable without the addition of water. The solids content of the rubber latex after the evaporation step (DIN 53 563) usually is equal to or exceeds 55, preferably is equal to or exceeds 60% by weight. The rubber component in case of a solids content of 68 weight % generally has a viscosity equal to or exceeding 2,500, preferably equal to or exceeding 2,000 mPa s as determined in the Brookfield viscosimeter (Spindel III, 30 rpm, 20° C.).

The component B can be obtained in a known manner, e.g., in accordance with DE-PS 28 22 148. On the other hand, the filler/rubber powders described inter alia in DE-PS 26 54 358, which contain interfering amounts of anionic (anion active) emulsifiers from the group of sulphonic acids or their salts, are unsuitable; the same applies to the filler/rubber powders described inter alia in DE-PS 24 39 237 which comprise interfering amounts of cationic emulsifiers, anionic emulsifiers from the group of sulphonic acids, sulphuric acid hemiesters and their salts or nonionic emulsifiers, and also to DE-Patent Application number P 36 06 742.3, because the silicic acid/rubber powders inter alia described in that application contain interfering amounts of cationic emulsifiers (tensides), cationic polymers or non-ionic emulsifiers (tensides). For any candidate powder system, simple routine pilot experiments will be adequate in order to identify whether any additives are present which interfere, e.g., with the gelling of the foamed mass. Satisfactory gelling properties will be apparent, for example, from an adequately uniform pore structure of the latex foam produced.

Suitable rubbers in the component B include NR, synthetic, highly unsaturated rubbers which are obtained by emulsion polymerization (free radical induced polymerization) in the presence of conventional fatty soaps and/or rosin soaps serving as emulsifiers or by solution polymerization, or a mixture of the aforesaid rubbers.

Examples of polydiene rubbers suitable for use in both components A and B include NR, which when present in the component B is preferably non-degraded and the synthetic polydiene rubbers, such as for example CR, isoprene rubber (IR), butadiene rubber (BR) and 1,3 butadiene/isoprene-copolymerizates. Examples for the similarly suitable cycloolefin ring-opening polymerizates include pentene polymers (polypentenylenes) and octene polymers (polyoctenylenes).

SBR, acrylic nitrile-butadiene rubbers (NBR) and the synthetic polydiene rubbers in the components A and B can be modified in the usual manner in that their macromolecules are based on structural units derived from the polymerization of conventionally suitable copolymerizable comonomers (modifying components). They are preferably non-carboxylated.

The rubbers in the component A may correspond to the rubbers in component B or may differ therefrom.

Suitable fillers are well known and include all those conventional for rubbers.

The rubber-type carbon black filler in the component B may for example be selected from highly active carbon black (carbon black for tire tread). Examples of finely particulate inorganic fillers conventional in rubber technology in component B are chalk, kaolin, slate powder, silicic acid such as active (highly dispersed) silicic acid, which is preferably hydrophobized with a conventional silane bonding agent, and aluminum hydroxide. The latter is of interest, because of its flame-retardant effect.

Suitable sulphur vulcanizing agents include all known sulphur vulcanization systems. A preferred vulcanizing system contains sulphur in combination with the usual accelerators. The amount of vulcanizing agent depends on the remaining components of the composition of matter according to the invention and may be determined by simple pilot experiments in accordance with fully conventional considerations.

The vulcanizing agent is generally employed in the form of a finely particulate, aqueous dispersion attained by grinding a suspension of the vulcanizing agent in water. The aqueous vulcanizing agent dispersion is usually added as a whole to the component A or to both components (A and B).

It is also possible to proceed in such manner that the vulcanizing agent is partly added to the component B as a finely divided dispersion in a plasticizer oil obtained by grinding a suspension of the vulcanizing agent in the plasticizer oil, and partly to the component A or to both components (A and B) as a finely divided aqueous dispersion. This is advantageous if the vulcanizing agent is given adequate opportunity to diffuse into the component B, e.g., by storage of the component B loaded with the vulcanizing agent or of the vulcanizable composition of matter according to the invention (maturing). In that case the plasticizer oil diffuses through the component B and at the same time promotes the diffusion of the vulcanizing agent. It is preferred to store the vulcanizable composition of matter.

Suitable plasticizer oils include aromatic, aliphatic and naphthenic hydrocarbons and mixtures thereof. They typically are used in amounts of 0–80 wt% based on the amount of rubber contained in B.

Conventional additives include for example fatty soaps and rosin soaps (which may for example be present in the rubber component in an amount adequate for the further processing of the composition according to the invention), aging and light protection agents, thickening agents, for example carboxymethyl cellulose, flame-retarding additives which as a general rule are mixtures of synergistically acting substances, and fillers conventionally used in rubber technology such as for example active carbon for rubber, e.g., highly active carbon black, and finely divided inorganic fillers such as for example chalk, kaolin, slate powder, aluminum hydroxide and silicic acid such as active silicic acid. The inorganic fillers may be hydrophobized in a conventional manner. The active silicic acid is for example hydrophobized by means of a conventional silane bonding agent.

The composition of this invention preferably contains essentially no additional fillers other than those of component B.

Component B may be reinforced. Coating of the powder particles with a reinforcing agent (reinforcing polymer material) is generally disadvantageous (USP 4,375,497).

Generally the amount of B is 20–300 wt% based on the dry weight of A. Generally the amount of filler in B is 20–100 wt% based on the amount of rubber in B.

A preferred mixture complies with the following definition: Component B amounts to 20 to 300 wt% based on the dry component A; Component B contains 20 to 100 wt% filler and 0 to 80 wt% plasticizer oil, each based on the amount of rubber contained in B;

The particle size of the component B is characterized as follows: Less than 10 wt% has a particle diameter exceeding 1 and up to 2 mm (DIN 66 165); and the mean particle diameter is 50 to 600 µm (DIN 53 477 in conjunction with DIN 66 145). There are to be essentially no particles having a diameter exceeding 2 mm.

The rubbers contain essentially no interfering amounts of additives (cationic emulsifiers, cationic polymers, anionic emulsifiers from the group of sulphonic acids, sulphuric acid hemi-esters and their salts, nonionic emulsifiers) which would interfere with the gelling of the foam mass. It is best to use rubbers as free as possible of such interferants. The upper limit needed to avoid gelling interference can be routinely determined by a few routine preliminary experiments where necessary.

The following mixture is particularly preferred:

The amount of component B is 30 to 200 wt% based on the component A (dry);

Component A is a polydiene rubber latex, an SBR latex, an NBR latex or a mixture of these latices;

The rubber in component B is a polydiene rubber, an SBR, an NBR, a cycloolefin ring-opening polymerization product or a mixture of the aforesaid rubbers;

The component B contains 20 to 80 wt% filler and 0 to 50 wt% plasticizer oil, each based on the rubber contained in B;

The particle size of the component B is characterized as follows:

Less than 10 wt% having a particle diameter exceeding 0.8 up to 1.5 mm; mean particle diameter: 100 to 500 $\mu$m. There are to be essentially no particles having a diameter exceeding 1.5 mm;

The filler in component B is a carbon black for rubber, a finely particulate inorganic filler as conventionally used in rubber technology or a mixture of these, the inorganic fillers being optionally hydrophobized in a conventional manner; and The plasticizer oil in the component B is an aromatic, aliphatic or naphthenic hydrocarbon or a mixture thereof.

The following applies to a special embodiment:

the amount of component B is 30 to 150 wt% based on the component A (dry);

the component A is an NR latex;

the component B contains 40 to 80 wt% filler and 0 to 20 wt% plasticizer oil, each based on the rubber contained in B.

Foaming, gelling and vulcanizing are accomplished in the usual manner. Depending on the purpose of application of the latex foams, both more and less intensely foamed compositions, chosen by conventional considerations, as a rule have excellent gelling properties. This is apparent from the uniformly fine pore structure of the latex foams obtained. The reliability of attaining an adequately uniform pore structure in the manufacture of latex foams on a technical scale per this invention is increased by entirely avoiding auxiliaries, which potentially interfere with the gelling of the foam mass, in the rubber component and by employing 30 wt% or more of the component B, based on the component A (dry).

The compositions according to the invention permit the reliable production of latex foams having a layer thickness of more than 10 mm which at 6% deformation exhibit an indentation hardness C of more than 500N. Such latex foams as a rule have a mass to volume ratio of more than 0.3 and up to 0.7 g/cm$^3$. They can be denoted as heavy foams. Layer thicknesses of 50 mm are attainable.

It of course is possible with the compositions according to this invention also to produce latex foams which at 6% deformation have an indentation hardness C equal to or less than 500N. Such latex foams generally have a mass to volume ratio equal to or less than 0.3 g/cm$^3$. The reliability for attaining an adequately uniform pore structure in the manufacture of such latex foams on a technical scale (layer thickness for example 10 mm) is comparatively high even if only 20 to less than 30 wt% of component B based on component A (dry) is employed. In such extreme cases, it is recommended to avoid completely those auxiliaries in the rubber component which potentially interfere with gelling of the foamed mass.

The above-defined property c (in addition to properties a and b) is attained for example, if a composition is employed containing no additional fillers and comprising a component A characterized as follows. The latter contains no reinforcing polymerization products; the rubbers in both components A and B are amorphous and comprise a low content of structural units derived from the polymerization of styrene (e.g., 0–10 wt%) and from 1,2- and 3,4-polymerization of the dienes (e.g., about 10 wt%). Accordingly, they exhibit a correspondingly low glass transition temperature (freezing range, Tg, e.g., −90° to −70° C.). The rapid diffusion of the vulcanizing agent in these rubbers as compared with a rubber having a higher Tg is an advantage. The component B contains no plasticizer oil and comprises a low filler content (e.g., 20–30 wt%) of low activity (inorganic filler).

The crosslinking density in the vulcanization product (latex foam) is adequately high.

The latex foam so attained when subjected to 25% deformation in the temperature range of about −30° to 70° C. exhibit a low residual compressive deformation, i.e., because of the maintenance of the rubber elastic condition down to about −30° C. they may exhibit good cold properties.

Property d (in addition to properties a and b) can be attained for example if a composition is employed comprising a component A characterized as follows: it is reinforced; the component B contains plasticizer oil and has a high filler content, e.g., 80–100 wt%. The rubbers in the two components A and B are not amorphous, but partly crystalline. Their macromolecules may contain polystyrene blocks.

The rubber in component A has a high content of structural units obtained by the polymerization of styrene (e.g., 30–40 wt%). The rubber in component B is obtained by solution polymerization in the presence of a lithium organic catalyst and a Lewis base and comprises a high content of structural units obtained by the polymerization of styrene and by 1,2- and 3,4-polymerization of the dienes (a high Tg, e.g., −30° to −10° C., of the chain segments in the macromolecules corresponds to a low mobility of the chain segments; cf. DE-OS 24 59 357, EP-OSS 95 629 and 173,791). The slow diffusion of the vulcanizing agent in this rubber of high Tg is disadvantageous when compared with the diffusion of the vulcanizing agent in a rubber of low Tg, and so are the poorer cold properties of the latex foam so attained.

Property e (in addition to properties a and b) can be attained for example if the examples in accordance with the invention described further below are followed.

Latex foams having the property combination a/b/e are suitable as vibration damping materials, the mass to volume ratio and correspondingly the hardness being adjustable to a high or low value depending on the purpose of use.

With the materials according to the above-defined special embodiment it is possible to attain latex foams which have the property combination a/b/e in addition to a high tensile strength (e.g., 0,5 N/mm$^2$) (DIN 53 571) and a high elongation at break (e.g., 150%) (DIN 53 571). They are therefore excellently suited as vibration damping materials (see latex foam 3, Table).

Latex foams obtained from compositions having a high content of component B with a high content of rubber-type carbon black, for example a high activity carbon black, in particular a high conductivity carbon black are characterized by a low electrical resistance.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

The reference composition and the reference latex foam which do not comply with the invention are denoted as V.

The viscosity was determined as described in the specification unless stated otherwise.

Component A1

SBR-latex obtained by emulsion polymerization in the presence of potassium oleate as emulsifier. The SBR contains 26% structural units derived from the polymerization of styrene. The latex was agglomerated and evaporated down.

Solids content: 68%.
Viscosity: 1,000 mPa s.
pH (DIN 53 606): 11.
Surface tension (DIN 53 593): 43 mN/m.
Mooney-viscosity of the rubber (ML$_{1+4}$, 100° C., DIN 53 523): about 120.

Component A2

NR latex.
Solids content: 60%.
Viscosity (Spindel I): 2,800 mPa s.
pH: 9.5.
Surface tension: 40.5 mN/m.

Component A3

The agglomerated SBR latex on which component A1 was based was mixed with a conventional reinforcing latex (21 parts reinforcing polymerization product based on 100 parts SBR). The reinforcing polymerizate contained 95% structural units derived from the polymerization of styrene and 5% structural units derived from the polymerization of 1,3 butadiene. The mixture of the latices was evaporated down.

Solids content: 67%.
Viscosity: 1,600 mPa s.
pH: 10.2.
Surface tension: 39 mN/m.

Component B1

Carbon black N-330/SBR powder obtained in accordance with DE PS 28 22 148. The SBR was obtained by emulsion polymerization in the presence of fatty soap/-rosin soap as an emulsifier. It contained 23.5% structural units derived from the polymerization of styrene.

Mooney viscosity of the rubber: about 100.

The powder was stabilized with discoloration. It contained 76 parts carbon black based on 100 parts of the rubber.

Particle size of the powder: less than 10% with a particle diameter exceeding 0.8 and up to 1,5 mm; mean particle diameter about 200 $\mu$m; there were essentially no particles having a diameter exceeding 1.5 mm.

Component B2

Carbon black N-110/SBR powder, obtained in accordance with DE-PS 28 22 148. The SBR was obtained by emulsion polymerization in the presence of fatty soap/-rosin soap used as emulsifier. It contained 23.5% structural units derived from the polymerization of styrene.

Mooney viscosity of the rubber: about 50.

The powder was stabilized with discoloration. It contained 50 parts carbon black based on 100 parts of the rubber.

Particle size of the powder: less than 10% having a particle diameter exceeding 0.8 and up to 1.5 mm; mean particle diameter: about 350 $\mu$m; there were essentially no particles having a diameter exceeding 1.5 mm.

Vulcanization agent dispersion

Produced by grinding (ball mill, 24 hours, room temperature) of the mixture obtained in accordance with the following recipe (particle diameter estimated from REM photograph at 2,000 fold magnification: less than 10 $\mu$m).

| | |
|---|---|
| Sulphur | 2.0 parts |
| Zinc oxide | 3.0 parts |
| Zinc diethyldithiocarbamate | 1.0 part |
| Zinc-2-mercaptobenzothiazole | 1.0 part |
| Diphenylguanidine | 1.0 part |
| 2,2'-methylene-bis-(4-methyl-6-tert.-butylphenol) | 1.0 part |
| Bentonite | 0.09 part |
| Sodium salt of an alkylnaphthalin sulphonic acid | 0.45 part |
| Water | 8.46 parts |

Sodium silicofluoride dispersion

Produced by grinding (ball mill, 24 hours, room temperature) of the mixture obtained in accordance with the following recipe (particle diameter estimated from REM photograph at 2,000 fold magnification: less than 10 $\mu$m).

| | |
|---|---|
| Sodium silicofluoride | 25.0 parts |
| Bentonite | 2.0 parts |
| Aqueous caustic potassium (10%) | 1.0 part |
| Water | 72.0 parts |

Production of the foamable, gelable and heat-vulcanizable compositions 1 to 5 and V

Composition 1

(100 parts A1/100 parts B1)

The composition was produced in accordance with the following prescription. For this purpose the components were brought together in the sequence stated and mixed with intense agitation.

|   | Parts (dry) |
|---|---|
| Component A1 | 100.0 |
| Potassium oleate | 1.5 |
| Component B1 (57% rubber) | 100.0 |
| Vulcanizing agent dispersion | 14.9 ($\frac{14.9}{157} = \frac{9.5}{100}$) i.e., 9.5 parts based on 100 parts rubber) |
| pyrogenous (highly dispersed) silicic acid | 0.01 |
| Solids content | 75% |
| Viscosity | 1,600 mPa s |
| pH | 10.3 |

Compositions 2 to 5

Analogously the following further compositions were produced. For this purpose the amount of vulcanizing agent dispersion was in each case adapted to the total amount of rubber.
Composition 2: 100 parts A1/50 parts B1.
Composition 3: 100 parts A1/150 parts B1.
Composition 4: 100 parts A2/100 parts B1.
Composition 5: 100 parts A1/100 parts B2.

Composition V (100 parts A3)

|   | Parts (dry) |
|---|---|
| Component A3 (83% rubber) | 100.0 |
| Potassium oleate | 1.5 |
| Chalk | 20.0 |
| Vulcanizing agent dispersion | 9.5 |
| Pyrogenous silicic acid | 0.01 |

Production of latex foams 1 to 4 and V

The compositions were foamed in a foam beating machine by beating air thereinto to such an extent that the latex foams obtained had the mass to volume ratios as stated in the following table. Subsequently an adequate amount of sodium silicofluoride dispersion (NSF) was added and stirred in such a manner that good mixing was attained without further foaming (approximately 2 minutes). The mass so attained was immediately poured into an open-topped box mold (40 cm×40 cm×5 cm) and gelled at room temperature. The NSF quantity was so proportioned that gelling was completed 5 to 10 minutes after commencement of the NSF addition (approximately 3 parts NSF, dry/100 parts component A, dry).

In the case of the manufacture of the latex foam V, 10 parts of a 2.5% aqueous carboxymethyl cellulose solution was added after foaming. Gelling in an open-topped box mold (40 cm×40 cm×2.5 cm) took place in an infrared zone (10 kW/m$^2$). The NSF amount had been so proportioned that gelling was completed after 2 to 4 minutes in the infrared zone (about 2 parts NSF, dry/100 parts rubber component A3, dry).

Heating for vulcanizing proceeded for about 30 minutes with saturated steam to 100° C. The vulcanization products were removed from the box mold, laid onto the wire gauze and dried in the drying oven with hot air for 16 hours at 80° C. (post-vulcanization).

The latex foams so obtained have the characteristics in accordance with the following table.

TABLE

| latex foam | Composition | Characteristics of latex foam | | | | |
|---|---|---|---|---|---|---|
| | | Mass/volume (g/cm$^3$) | Indentation hardness C* (N) | Residual compressive deformation (%)** | | Pore structure |
| | | | | 72 h/23° C. | 22 h/70° C. | |
| 1.1 | 1 (100 p. A1/100 p. B1) | 0,275 | 540 | 2.0 | 2.3 | uniform, normal fineness |
| 1.2 | 1 | 0,350 | 1 130 | 2.4 | 2.6 | uniform, normal fineness |
| 1.3 | 1 | 0,400 | 2 000 | 2.2 | 2.9 | uniform, normal fineness |
| 1.4 | 1 | 0,470 | 2 400 | 2.1 | 3.5 | uniform, normal fineness |
| 1.5 | 1 | 0,540 | 3 450 | 2.4 | 3.7 | uniform, normal fineness |
| 2.1 | 2 (100 p. A1/50 p. B1) | 0,475 | 1 880 | 1.7 | 3.0 | uniform, normal fineness |
| 2.2 | 1 (100 p. A1/100 p. B1) | 0,530 | 2 870 | 1.7 | 3.1 | uniform, normal fineness |
| 2.3 | 3 (100 p. A1/150 p. B1) | 0,530 | 3 960 | 2.6 | 2.9 | uniform, normal fineness |
| 3 | 4 (100 p. A2/100 p. B1) | 0,400 | 1 320 | 3.1 | 2.7 | uniform, normal fineness |
| 4 | 5 (100 p. A1/100 p. B2) | 0,470 | 2 370 | 2.1 | 3.9 | uniform, normal fineness |
| V | V (100 p. A3) | 0,463 | 3 450 | 5.0 | 15.4 | non-uniform, coarse |

*at 6% deformation
**after storage under the stated conditions in the compressed state (25% deformation)

The latex foams 2.1 to 2.3 serve to demonstrate the dependency of the indentation hardness C from the amount of rubber component B based on the rubber component A. Analogously for a given indentation hardness C it is possible to aim at the lowest possible mass/volume ratio (economics). In this context care is to be taken that depending on the intended use, additionally required properties such as long-term compression fatigue, tensile strength (DIN 53571) and elongation at break (DIN 53 571) are still acceptable. These properties depend, e.g., on the extent of foaming and the nature of the component A, i.e., on the nature of the rubber and the size of the latex particles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a foamable, gelable and heat-vulcanizable composition comprising an aqueous rubber dispersion and a sulfur vulcanizing agent, the improvement wherein:
   the rubber dispersion is a mixture of effective amounts of (A) a natural rubber latex, a synthetic, highly unsaturated rubber latex containing at least 50% by weight of structural units obtained by polymerization of dienes, or a mixture thereof, and (B)

a powder comprising a mixture of: (a) filler and (b) a natural rubber, a synthetic, highly unsaturated rubber containing at least 50% by weight of structural units obtained by polymerization of dienes, or a mixture thereof.

2. A composition according to claim 1, wherein the rubber dispersion (A) is reinforced by means of a polymerization product dispersion.

3. A composition according to claim 1, wherein the powder (B) further comprises a plasticizer oil.

4. A composition according to claim 1, wherein less than 10 wt% of the powder (B) has a particle diameter exceeding 1 and up to 2 mm and the powder has a mean particle diameter of 50 to 600 μm.

5. A composition according to claim 1, wherein the rubber in (A) is natural rubber, chloroprene rubber or styrene-butadiene rubber.

6. A composition of claim 1, wherein the solids content in (A) is equal to or greater than 55 wt%.

7. A composition of claim 1, wherein the rubber in (B) is natural rubber, chloroprene rubber, isoprene rubber, butadiene rubber, a 1,3-butadiene/isoprene copolymerizate, or a cycloolefin ring-opening polymerizate.

8. A composition of claim 1, wherein the filler in (B) is a carbon black, chalk, kaolin, slate powder, silicic acid or aluminum hydroxide.

9. A composition of claim 1, further comprising a fatty soap, a rosin soap, an aging or light protection agent, a thickening agent, a flame retardant or an additional filler.

10. A composition of claim 1, wherein the amount of B is 20–300 wt% based on A dry; the amount of filler in B is 20–100 wt% based on the amount of rubber in B; and the particle size of B is such that less than 10 wt% has a diameter exceeding 1 and up to 2 mm and B has a mean particle diameter of 50–600 μm.

11. A composition of claim 1, essentially free of additives interfering with subsequent gelling of the composition.

12. A composition of claim 10, essentially free of additives interfering with subsequent gelling of the composition.

13. A composition of claim 1, wherein the amount of B is 30–200% based on the amount of A dry; A is a polydiene rubber latex, a styrene butadiene rubber latex a nitrile-butadiene rubber latex or a mixture thereof; the rubber in B is a polydiene rubber, styrene butadiene rubber, nitrile butadiene rubber, a cycloolefin ring-opening polymerization product or a mixture thereof; the amount of filler in B is 20–80 wt.% based on the rubber in B and the particle size of B is such that less than 10 wt.% has a particle diameter exceeding 0.8 and up to 1.5 mm and B has a mean diameter of 100–500 μm.

14. A composition of claim 1, wherein the amount of B is 30–150 wt% based on the amount of A dry, A is a natural rubber latex; and the amount of filler in B is 40–80 wt%, based on the rubber in B.

15. In a latex foam prepared by foaming a foamable composition, the improvement wherein said composition is one of claim 1.

* * * * *